United States Patent [19]
Hsu et al.

[11] Patent Number: 5,998,977
[45] Date of Patent: Dec. 7, 1999

[54] SWITCHING POWER SUPPLIES WITH LINEAR PRECHARGE, PSEUDO-BUCK AND PSEUDO-BOOST MODES

[75] Inventors: Jean F. Y. Hsu, San Jose; Tunc Doluca, Saratoga, both of Calif.

[73] Assignee: Maxim Integrated Products, Inc., Sunnyvale, Calif.

[21] Appl. No.: 09/085,312

[22] Filed: May 27, 1998

[51] Int. Cl.[6] .............................. G05F 1/40; G05F 1/569; H02H 7/10
[52] U.S. Cl. ........................ 323/272; 323/908; 323/276; 363/50
[58] Field of Search ........................ 363/49, 50; 323/908, 323/268, 271, 272, 273–276, 222

[56] References Cited

U.S. PATENT DOCUMENTS

| | | | |
|---|---|---|---|
| 3,984,799 | 10/1976 | Fletcher | 363/21 |
| 4,578,630 | 3/1986 | Grosch | 323/271 |
| 5,144,222 | 9/1992 | Herbert | 323/271 |
| 5,313,382 | 5/1994 | Farrington | 363/16 |
| 5,402,060 | 3/1995 | Erisman | 323/268 |
| 5,565,761 | 10/1996 | Hwang | 323/282 |
| 5,602,463 | 2/1997 | Bendall et al. | 323/266 |
| 5,736,842 | 4/1998 | Jovanovic | 323/222 |
| 5,856,919 | 1/1999 | Moriaty, Jr. | 363/101 |

OTHER PUBLICATIONS

Maxim Product Data Sheet 19–0382; Rev. 1; Aug. 1995; "Dual–Output, 1MHz DC–DC Boost Converter for PCM-CIA Applications".

Primary Examiner—Peter S. Wong
Assistant Examiner—Bao Q. Vu
Attorney, Agent, or Firm—Hickman Stephens & Coleman, LLP

[57] ABSTRACT

The present invention teaches a variety of startup modes for operating a boost type switching power supply. A linear charging mode couples the input voltage directly to the output voltage, thereby precharging the output capacitor of the switching power supply. The linear mode serves to reduce inrush battery current and limit the stress voltage on the power switching devices. A pseudo-buck mode, preferably entered into after the linear mode has precharged the output capacitor, operates the boost type switching power supply in a manner providing power to the output essentially as a buck type switching power supply would. This results in continuous charging of the output capacitor, thereby reducing startup time and increasing power efficiency. The pseudo-buck mode also enables step-down voltage generation with boost type circuitry. A pseudo-boost mode facilitates a smooth transition between the pseudo-buck and traditional boost modes. The power devices are operated in the pseudo-buck mode such that control over the inductor current is maintained to minimize inrush current.

58 Claims, 4 Drawing Sheets

SWITCHING POWER SUPPLIES WITH LINEAR PRECHARGE, PSEUDO-BUCK AND PSEUDO-BOOST MODES

DESCRIPTION

1. Technical Field

The present invention is related to DC to DC switching power supplies, particularly those having boost type circuit topology. More specifically, the present invention teaches three different operating modes for a boost type circuit that together provide control over the inductor inrush current, as well as allowing the use of smaller power devices by limiting the operating voltage seen by the power devices.

2. Background Art

Switching power supplies are known in the art. Typical uses of switching power supplies include generating a constant, regulated output voltage Vout from an input source, whose voltage Vin may be decreasing in amplitude over time. A switching power supply having a "boost" circuit topology is capable of generating a regulated output voltage Vout that is greater than the unregulated supply voltage Vin. As an example, a switching power supply may be used to generate a regulated output voltage Vout from the potential difference across terminals of a battery in order to operate an electrical device such as a portable computer, a radio, a CD player, a cellular phone or the like. As the electrical device drains energy from the battery, the input voltage Vin supplied by the battery diminishes over time, and it is the job of the boost regulator to continue generating a constant output voltage Vout to keep the electrical device operating.

With reference to FIGS. 1–2, the topography and operation of a traditional boost switching regulator 100 of the Prior Art will now be described. Prior Art FIG. 1 illustrates the boost switching regulator 100 including an inductor L, an output filter capacitor C, an n-channel Metal-Oxide Semiconductor Field Effect Transistor (NMOS) switch 102, a p-channel MOSFET (PMOS) switch 104, and duty-cycle control circuitry 106. Voltage Vin is typically an unregulated source of DC voltage connected to a first terminal of the inductor L and to a common ground reference 110. The second terminal of the inductor L and the drains of the switches 102 and 104 are coupled together at a node Lx. The source and body of the PMOS switch 104 are coupled together at a first terminal of the capacitor C, thereby forming a PMOS body diode from Lx to the first capacitor terminal. The control circuitry 106 implements a duty-cycle algorithm, controlling the operation of the NMOS switch 102 and the PMOS switch 104. The second terminal of the capacitor C, a second terminal of the voltage Vin, and the source and body of the NMOS switch 102 are all coupled to a common ground reference 110. The output voltage Vout of the switching regulator 100 measured across the output capacitor C.

Prior Art FIG. 2 illustrates a state diagram 150 for operation of the boost switching regulator 100. During an on-cycle 152, the duty-cycle control 106 turns the NMOS switch 102 on and the PMOS switch 104 off. The inductor current T1 thus increases at a rate of about Vin/L and, since the PMOS switch 104 is off, no power is transferred from the inductor L to the output. During an off-cycle 154, the duty-cycle control 106 turns the NMOS switch 102 off and the PMOS switch 104 on. Hence during the off-cycle 154, power is transferred from the inductor L to the output and the inductor current I1 decreases at a rate of (Vout−Vin)/L. For ease of reference, the relevant control voltages for the on-cycle 152 and the off-cycle 154 are shown in both FIG. 2 and in the following table.

| Traditional Boost | NMOS Gate Drive | PMOS Gate Drive | PMOS Body |
|---|---|---|---|
| On-Cycle 152 | Vin | Max(Vin, Vout) | Vout |
| Off-Cycle 154 | Ground | Ground | Vout |

As will be appreciated, a variety of duty-cycle algorithms can be implemented by the duty-cycle control 106 in order to regulate the output. For example, in a constant ripple, hysteretic converter, the on-cycle 152 is terminated when the inductor current reaches a predetermined maximum value, and the off-cycle 154 is terminated when the inductor current drops below a predetermined minimum value.

Although the traditional boost topology is effective for regulating power under certain circumstances, both the traditional topology and the prior art control algorithms have significant drawbacks. One such drawback is the inability of prior art algorithms to limit inrush current across a variety of input and output voltages. Large inrush currents tend to drastically reduce the life of battery input power supplies. What is needed is a boost switching power supply capable of limiting inductor current at any point regardless of the input and output voltages.

DISCLOSURE OF THE INVENTION

In order to achieve the foregoing and in accordance with the present invention, a variety of switching power supplies and methods for controlling the same are disclosed. In particular, the present invention teaches several modes for operating a boost type switching power supply. A linear charging mode couples the input voltage directly to the output voltage, thereby precharging the output capacitor of the switching power supply. The linear mode serves to reduce inrush battery current and limit the stress voltage on the power switching devices. A pseudo-buck mode, preferably entered into after the linear mode has precharged the output capacitor, operates the boost type switching power supply in a manner providing power to the output essentially as would a buck type switching power supply. This results in continuous charging of the output capacitor, thereby reducing startup time and increasing power efficiency. The pseudo-buck mode also enables step-down voltage generation with boost type circuitry. A pseudo-boost mode facilitates a smooth transition between the pseudo-buck and traditional boost modes. The power devices are operated in the pseudo-buck mode such that control over the inductor current is maintained to minimize inrush current.

One specific embodiment of the present invention teaches a switching power supply having an inductor, an output capacitor, first and second variable impedance devices, and a control circuit for controlling the first and second variable impedance devices. The first variable impedance device couples the inductor and the output capacitor terminal together. The second variable impedance device couples the inductor to a common ground reference. The control circuit is operable to implement one or more of a linear mode, a pseudo-buck mode, and a pseudo-boost mode.

The variable impedance devices may be formed from transistor switches such as NMOS and PMOS devices. In such a case, the pseudo-buck mode is implemented having an on-cycle and an off-cycle. During the pseudo-buck mode on-cycle, the second switch gate is coupled to the common ground reference, the first switch gate is coupled to the common ground reference, the diode anode is coupled to Vout, and the diode cathode is coupled to the second inductor terminal. During the pseudo-buck mode off-cycle, the second switch gate is coupled to the common ground reference, the first switch gate is coupled to a voltage suitable to choke the current flowing through the first switch, the diode anode is coupled to Vout, and the diode cathode is coupled to the second inductor terminal.

Another aspect of the present invention teaches a pseudo-boost mode having an on-cycle and an off-cycle. During the pseudo-boost mode on-cycle, the first switch gate is coupled to the greater of Vin and Vout, the second switch gate is coupled to Vin, the diode anode is coupled to the second inductor terminal, and the diode cathode is coupled to Vout. During the pseudo-boost mode off-cycle, the second switch gate is coupled to a ground reference, the first switch gate is coupled to Vin, the diode anode is coupled to Vout, and the diode cathode is coupled to the second inductor terminal.

In certain embodiments of the present invention, the power supply further includes a third variable impedance device such as a transistor switch having a gate, a source, and a drain, the drain being coupled to the first inductor terminal and the source being coupled to Vout. This enables operation of the power supply in a linear mode during which both the first and second switches are disabled and the third switch gate is coupled to Vin, thereby directly coupling the input voltage Vin to the output voltage Vout through the third switch.

In preferred embodiments, the power supply is initially operated in the linear mode in order to precharge the output capacitor. Once the output capacitor has reached a desired precharge voltage Vpc, the power supply is operated in the pseudo-buck mode until Vout reaches a predefined threshold value $V_{r1}$ that is less than Vin. When Vout is between about $V_{r1}$ and $V_{r2}$, $V_{r2}$ being greater than or equal to Vin, the power supply is then operated in the pseudo-boost mode. Once Vout has exceeded about $V_{r2}$, the power supply is then operated according to a traditional boost duty-cycle algorithm.

BRIEF DESCRIPTION OF THE DRAWINGS

Prior Art

Prior Art

BEST MODES FOR CARRYING OUT THE INVENTION

Figure 3:
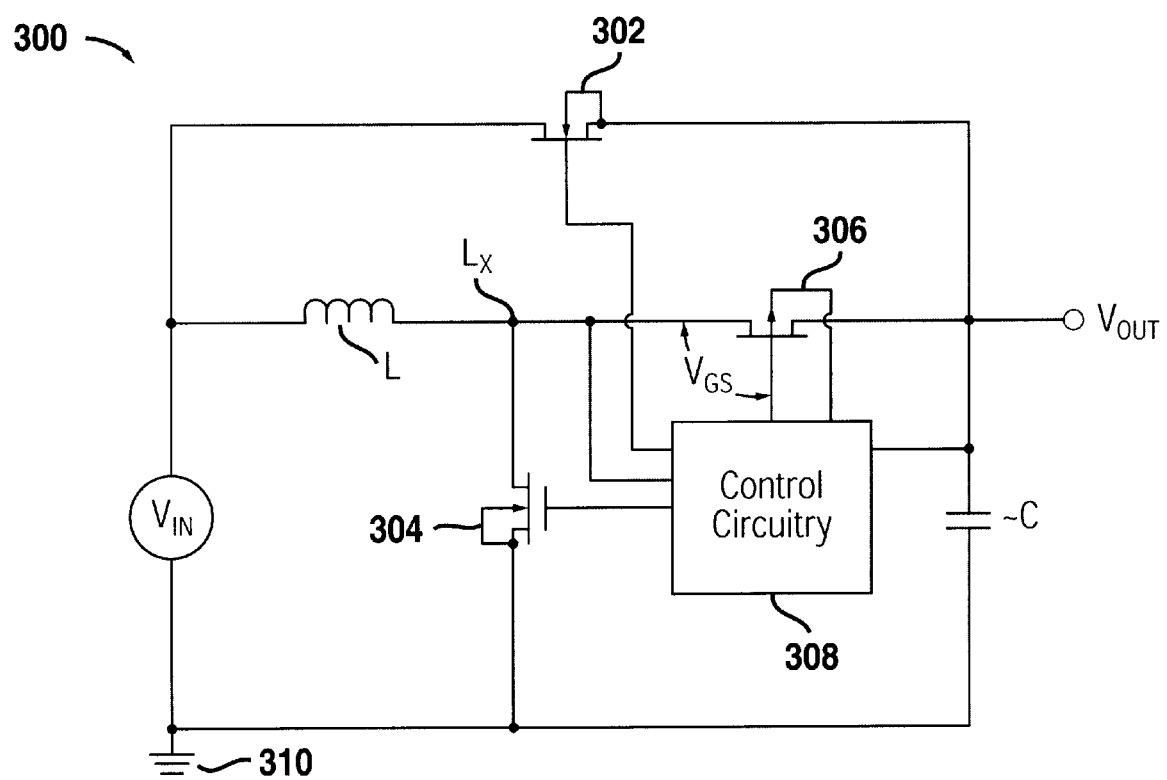
FIG. 3 is a schematic of a power supply in accordance with one embodiment of the present invention.

FIG. 3 illustrates a regulated switching power supply 300 in accordance with one embodiment of the present invention. The switching power supply 300 includes an inductor L, a capacitor C, two NMOS transistor switches 302 and 304, a PMOS transistor switch 306, and duty-cycle control circuitry 308. An input power supply provides a voltage Vin coupled to both a first terminal of the inductor L and at the drain of the NMOS switch 302, the voltage Vin measured with respect to a common ground reference 310. The source and body of the NMOS transistor 302, and the first terminal of the output filter capacitor C are coupled together forming the output voltage Vout of the power supply 300. The second terminal of the inductor L and the drains of both the NMOS switch 304 and the PMOS switch 306 are coupled together at a node Lx.

Control circuitry 308 is coupled to drive the gates of the transistors 302–306, and further to sense the voltages at an output Vout and a node Lx. The control circuitry 308 implements a duty-cycle algorithm for providing a regulated power supply having a regulated voltage Vout. Control circuitry 308 may be implemented in a microprocessor, programmable logic such as a PLD, PLL, PAL, or any other suitable circuitry. Several different control algorithms according to the present invention are described below.

Figure 4:
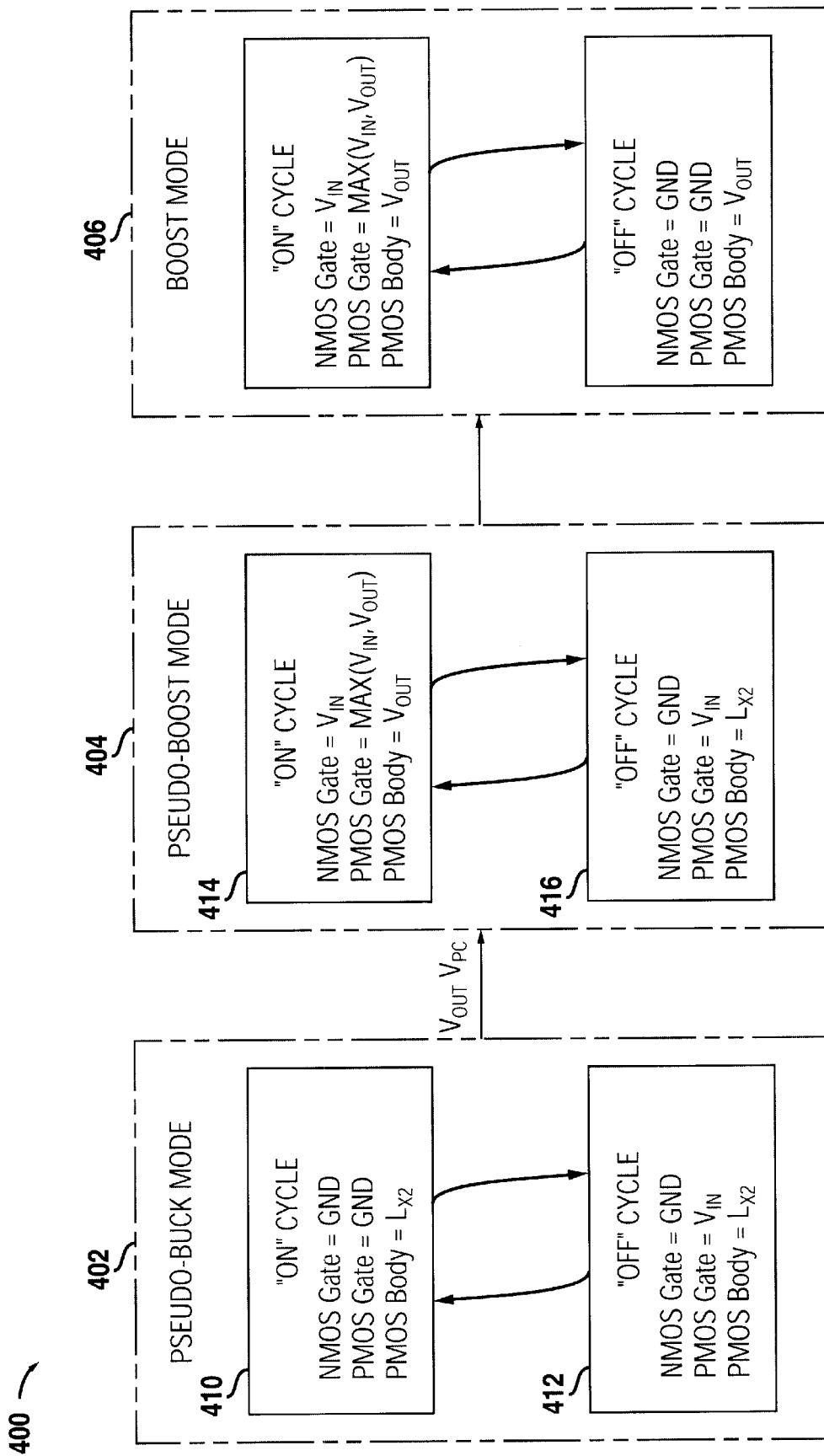
FIG. 4 illustrates a state diagram for several different modes of operation for the power supply of FIG. 3.

The present invention contemplates four distinct modes of operation for a boost power supply such as power supply 300 of FIG. 3, including three that are intended for implementation during startup as well as a more traditional boost mode. The startup modes are referred to herein as the "linear" mode, the "pseudo-buck" mode and the "pseudo-boost" mode. FIG. 4 illustrates a state diagram 400 progressing through a pseudo-buck, pseudo-boost, and boost modes. As will be described below, each of these modes has particular advantages and requirements. Further, in accordance with the present invention, these modes may be used individually or in various combinations with each other and the traditional boost mode.

The linear mode is a preferred control algorithm when the output voltage Vout is less than a predefined precharge voltage Vpc. During linear mode, the input power supply is directly coupled to the output, enabling the output voltage Vout to charge up to the precharge voltage. To accomplish this, the control circuitry 308 disables the NMOS switch 304 and the PMOS switch 306, and turns the NMOS switch 302 fully on.

Figure 1:
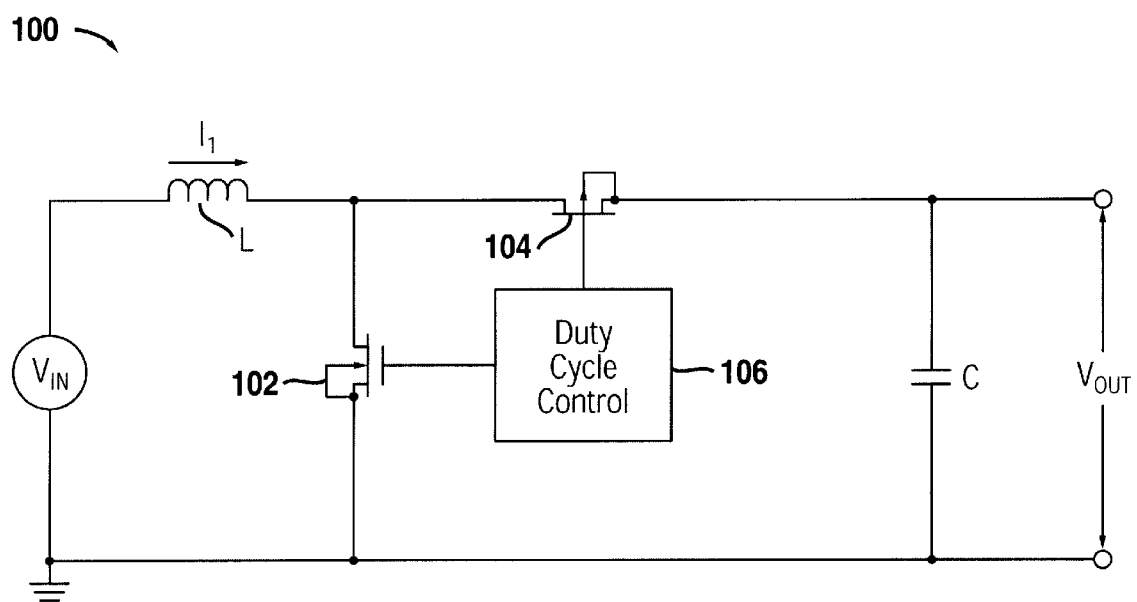
FIG. 1 is a schematic of a traditional boost power supply.

By directly coupling the input to the output, the linear mode reduces the battery inrush current normally seen across the inductor L during the initial charging of a regulated power supply. In order to implement the linear mode, the power supply 300 requires an additional NMOS switch, i.e., NMOS switch 302, not required in the traditional boost regulator 100 of FIG. 1. However, by precharging the output voltage Vout, the linear mode reduces the stress voltage placed upon the PMOS switch 306, particularly during the pseudo-buck mode described below. Because of this, the power supply 300 can be designed with a smaller, low-voltage PMOS switch 306. Thus even with an additional NMOS switch, there is nonetheless space savings over having to implement a large PMOS switch.

Once the output voltage Vout has charged up to the precharge voltage Vpc, one embodiment of the present invention teaches transitioning into a pseudo-buck mode 402. During the pseudo-buck mode 402, the NMOS switches 302 and 304 are disabled and the body of the PMOS switch 306 is connected to the node Lx. Hence, that portion of the power supply 300 utilized during the pseudo-buck mode 402 has a topology similar to that of a traditional buck power supply. (Essentially, the inductor L and the PMOS switch 306 are "swapped" with respect to the input voltage Vin.) In fact, as will be seen, the operation of the power supply 300 during the pseudo-buck mode 402 results in charging the output in a manner essentially identical to the traditional buck power supply.

During a pseudo-buck on-cycle 410, the PMOS switch 306 is turned on and the inductor current It increases at the rate of (Vin−Vout)/L. During a pseudo-buck off-cycle 412, the gate of the PMOS switch 306 is coupled to the input voltage Vin so that the inductor current decreases at a rate of Vgs(PMOS)/L. As shown in FIG. 3, Vgs(PMOS) is the voltage differential between the gate and the source of the PMOS switch 306 with the inductor current flowing through the PMOS switch 306.

In the off-cycle 412 of the pseudo-buck mode, as in the traditional buck mode, the inductor current I1 must still flow through the PMOS switch 306. However, the control circuitry 308 has set the gate of the PMOS switch 306 to Vin. Therefore, in order for current to keep flowing through the PMOS switch 306, the source of the PMOS switch 306 must fly up to at least a couple volts above the gate of the PMOS switch 306. For example, if the input voltage Vin is nominally 5 Volts, then during the off-cycle 412, the PMOS switch 306 source voltage must fly up to about 6–7 Volts to enable the inductor current to continue flowing. Hence, if one were to skip the linear mode and not precharge the output voltage Vout, the pseudo-buck mode 402 would apply about 6–7 Volts across the PMOS switch 306 during the off-cycle. As a result, a high-voltage, space inefficient PMOS switch would be required. However, providing the linear mode is one method for avoiding this large stress voltage. The precharge voltage should thus be set by reference to the breakdown voltage of the PMOS switch 306. Specifically, the precharge voltage Vpc should be greater than (Vin+Vgs(PMOS)–Vbreakdown). The precharge voltage Vpc should be chosen without forgetting, however, that the larger Vpc is, the more power inefficient the power supply 300 will be.

Because the inductor current I1 continuously charges the output capacitor C during the pseudo-buck mode 402, the startup time of the power supply 300 is less that than obtained by many traditional boost regulator startup algorithms. Further, there is an improvement in power efficiency of the power supply 300 during startup. Another advantage over traditional boost algorithms, the pseudo-buck mode 402 actually enables a circuit having a boost topology (i.e., the power supply 300) to provide a step down operation, working like a buck circuit.

For ease of reference, the relevant control voltages for the pseudo-buck mode 402 are shown in FIG. 4 and are also provided in the following table.

| Pseudo-Buck | NMOS Gate Drive | PMOS Gate Drive | PMOS Body |
| --- | --- | --- | --- |
| On-Cycle 410 | Ground | Ground | Lx |
| Off-Cycle 412 | Ground | Vin | Lx |

As Vout approaches Vin during the pseudo-buck mode 402, the duty-cycle of the PMOS switch 306 likewise approaches one-hundred percent (100%). In practice, a duty-cycle of 100% is not obtainable. However, immediately switching into a traditional boost mode algorithm from such a point is not suitable because the output voltage Vout is still less than the input voltage Vin.

Accordingly, once the output voltage Vout exceeds a second transition voltage Vt such as one diode below Vin, the present invention teaches transitioning into the pseudo-boost mode 404. The pseudo-boost mode 404 serves to facilitate a smooth transition between the pseudo-buck mode 402 and the traditional boost mode 406. Additionally, the pseudo-boost mode 404 provides even further control over the inductor current I1, thus further minimizing battery inrush current.

During an on-cycle 414 of the pseudo-boost mode 404, the gate of the NMOS switch 304 is tied to Vin, the gate of the PMOS switch 306 is tied to the greater of the input voltage Vin and the output voltage Vout, and the body of the PMOS switch 306 is tied to the output voltage Vout. As a result, during the on-cycle 414 the inductor current I1 increases at a rate of Vin/L. During an off-cycle 416, the gate of the NMOS switch 304 is tied to ground 310, the gate of the PMOS switch 306 is tied to Vin, and the body of the PMOS switch 306 is tied to Lx. Thus during the off-cycle, the inductor current I1 decreases at a rate of Vgs(PMOS)/L, similar to the off-cycle 412 of the pseudo-buck mode 402.

For ease of reference, the relevant control voltages for the pseudo-boost mode 404 are shown in the state diagram 400 of FIG. 4, and are also provided in the following table.

| Pseudo-Boost | NMOS Gate Drive | PMOS Gate Drive | PMOS Body |
| --- | --- | --- | --- |
| On-Cycle 414 | Vin | Max (Vin, Vout) | Vout |
| Off-Cycle 416 | Ground | Vin | Lx |

Figure 2:
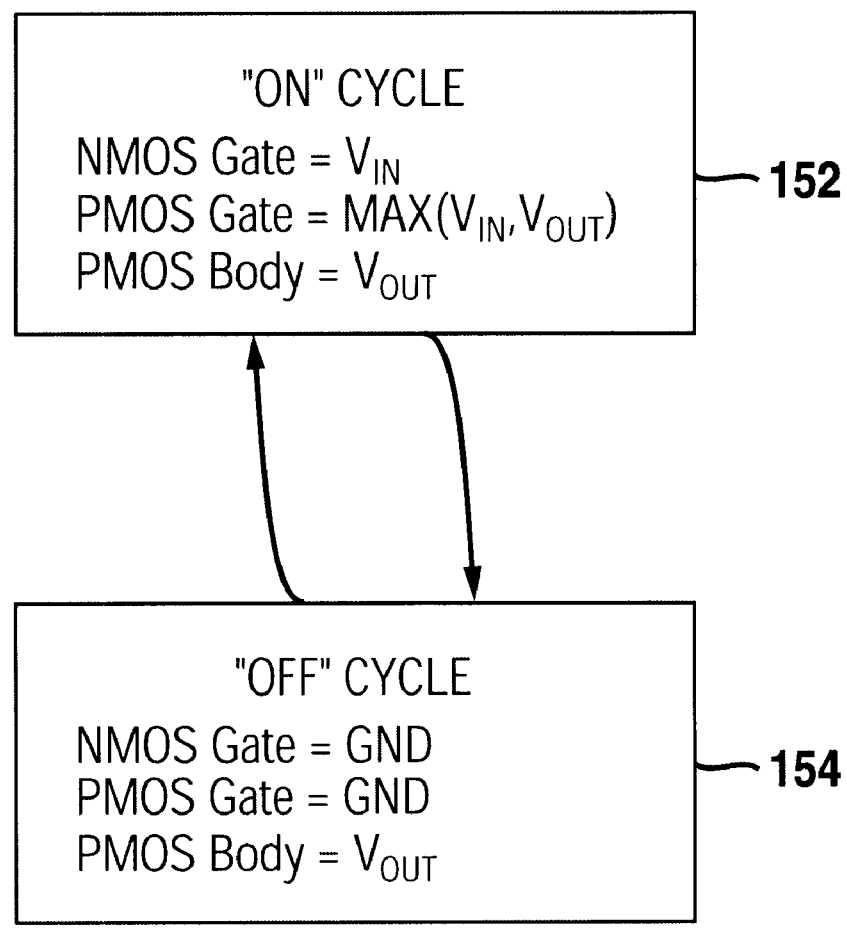
FIG. 2 illustrates a state diagram for the on- and off-cycles of the traditional boost power supply of FIG. 1.

Finally, once the output voltage exceeds the input voltage Vin, the power supply 300 will enter into a traditional boost mode, the duty-cycle control circuitry 308 implementing a suitable boost duty-cycle algorithm such as the hysterisis algorithm described above with reference to FIGS. 1 and 2.

Although only a few embodiments of the present invention have been described in detail herein, it should be understood that the present invention may be embodied in many other specific forms without departing from the spirit or scope of the invention.

It is not essential to the present invention that the duty-cycle control circuitry implement the algorithms for all three of the linear, pseudo-buck, and pseudo-boost modes. For example, by eliminating the linear mode, the smaller NMOS switch 302 could also be eliminated. Thus the pseudo-buck and pseudo-boost modes can be implemented on traditional boost topology without additional switching devices.

Without the linear mode, however, certain precautions must be taken to avoid the breakdown of the PMOS switch 306. Perhaps the crudest solution is to simply design the PMOS switch 306 large enough to handle the stress voltage that would arise during the pseudo-buck mode. However, more elegant solutions are contemplated. In particular, rather than coupling the gate of the PMOS switch 306 to Vin during the off-cycle 412, the control circuitry 308 could drive the gate of the PMOS switch 306 to Vin/2 or some other suitable voltage value. This would, similar to the linear mode, eliminate a high stress voltage across the PMOS switch 306.

The transistor switches described above were all MOSFET technology. However, those skilled in the art will recognize that the concepts of the present invention can be implemented utilizing other suitable variable impedance devices such as bipolar transistors.

Therefore, the present examples and embodiments are to be considered as illustrative and not restrictive, and the invention is not to be limited to the details given herein, but may be modified within the scope of the appended claims.

We claim:

1. A method for controlling a switching power supply to generate an output voltage Vout from an input power supply having first and second terminals and an input voltage Vin, the second input power supply terminal being coupled to a common ground reference, the switching power supply including a) an inductor having first and second terminals, the first inductor terminal and the first input power supply terminal being coupled together, the inductor having an inductance L, b) a capacitor having first and second terminals, the second capacitor terminal being coupled to the common ground reference, c) a first switch having a gate, a drain, a source and a body, the first switch operable such that a first gate bias voltage controls a flow of current through the first switch between the first switch drain and the first switch source, the first gate bias voltage being a voltage potential of the first switch gate over the first switch source, the second inductor terminal and the first switch source being coupled together, the first switch drain, the output node and the first capacitor terminal being coupled together, and d) a second switch having a gate, a drain, and a source, the second switch operable such that a second gate bias voltage controls a flow of current through the second switch between the second switch drain and the second switch source, the second gate bias voltage being a voltage potential of the second switch gate over the second switch source, the second switch drain and the second inductor terminal being coupled together, the second switch source being coupled to the common ground reference, the method comprising the acts of:

during a pseudo-buck mode on-cycle, coupling the second switch gate to the common ground reference, coupling the first switch gate to the common ground reference, whereby the inductor current increases at a rate of about (Vin−Vout)/L; and during a pseudo-buck mode off-cycle, coupling the second switch gate to the common ground reference, coupling the first switch gate to a voltage suitable to choke the current flowing through the first switch, coupling the first switch body to the second inductor terminal, whereby during pseudo-buck mode off cycle the first switch acts as a diode biased in the direction from Vout to the second inductor terminal and having a break-down voltage equivalent to the first gate bias voltage and whereby the inductor current decreases at a rate of about (the first gate bias voltage)/L.

2. A method as recited in claim 1 wherein the first switch is a PMOS transistor.

3. A method as recited in claim 2 wherein the diode is that diode connection formed by coupling the body of the PMOS transistor to the second inductor terminal.

4. A method as recited in claim 1 wherein the first switch is a pnp bipolar transistor.

5. A method as recited in claim 1 wherein the second switch is an NMOS transistor.

6. A method as recited in claim 1 wherein the second switch is a npn bipolar transistor.

7. A method as recited in claim 1 further comprising the acts of:

during a pseudo-boost mode on-cycle, coupling the first switch gate to the greater of Vin and Vout, coupling the second switch gates to Vin, coupling the diode anode to the second inductor terminal, and coupling the diode cathode to Vout, whereby the inductor current increases at a rate of about Vin/L; and during a pseudo-boost mode off-cycle, coupling the second switch gate to a ground reference, coupling the first switch gate to Vin, coupling the diode anode to Vout, and coupling the diode cathode to the second inductor terminal, whereby the inductor current decreases at a rate of about (the first gate bias voltage)/L.

8. A method as recited in claim 7 further comprising the act of sensing Vout, and wherein the power supply is operated in the pseudo-buck mode until Vout reaches a predefined threshold value $V_{t1}$ that is less than Vin, at which point the power supply is operated in the pseudo-boost mode.

9. A method as recited in claim 8 wherein the power supply is operated in the pseudo-boost mode when Vout is between about $V_{t1}$ and $V_{t2}$, $V_{t2}$ being greater than or equal to Vin.

10. A method as recited in claim 9 wherein the power supply is operated according to a traditional boost duty-cycle algorithm once Vout has exceeded about $V_{t2}$.

11. A method as recited in claim 9 wherein the power supply further includes a third switch having a gate, a source, and a drain, the drain being coupled to the first inductor terminal and the source being coupled to Vout.

12. A method as recited in claim 11 further comprising the acts of:

during a linear mode, coupling the third switch gate to Vin, thereby directly coupling the input voltage Vin to the output voltage Vout through the third switch, and disabling both the first and second switches, thereby charging the capacitor.

13. A method as recited in claim 12 wherein the power supply is operated in the linear mode until the output voltage Vout reaches a precharge voltage Vpc at which point the power supply is operated in the pseudo-buck mode.

14. A method as recited in claim 11 wherein the third switch is an NMOS transistor.

15. A method as recited in claim 1 wherein the power supply further includes a third switch having a gate, a source, and a drain, the drain being coupled to the first inductor terminal and the source being coupled to Vout.

16. A method as recited in claim 15 further comprising the acts of:

during a linear mode, coupling the third switch gate to Vin, thereby directly coupling the input voltage Vin to the output voltage Vout through the third switch, and disabling both the first and second switches, thereby charging the capacitor.

17. A method as recited in claim 16 wherein the power supply is operated in the linear mode until the output voltage Vout reaches a precharge voltage Vpc at which point the power supply is operated in the pseudo-buck mode.

18. A method as recited in claim 15 wherein the third switch is an NMOS transistor.

19. A method as recited in claim 1 wherein the voltage suitable to choke the current flowing through the first transistor is set to the input voltage Vin.

20. A method as recited in claim 1 wherein the voltage suitable to choke the current flowing through the first transistor is set to a fraction of the input voltage Vin.

21. A method as recited in claim 20 wherein the fraction of the input voltage Vin is Vin/2.

22. A method for controlling a switching power supply to generate an output voltage Vout from an input power supply having first and second terminals and an input voltage Vin, the second input power supply terminal being coupled to a common ground reference, the switching power supply including a) an inductor having first and second terminals, the first inductor terminal and the first input power supply terminal being coupled together, the inductor having an inductance L, b) a capacitor having first and second terminals, the second capacitor terminal being coupled to the common ground reference, c) a first switch having a gate, a drain, and a source, the first switch operable such that a first gate bias voltage controls a flow of current through the first switch between the first switch drain and the first switch source, the first gate bias voltage being a voltage potential of the first switch gate over the first switch source, the second inductor terminal and the first switch source being coupled together, the first switch drain, the output node and the first capacitor terminal being coupled together, and d) a second switch having a gate, a drain, and a source, the second switch operable such that a second gate bias voltage controls a flow of current through the second switch between the second switch drain and the second switch source, the second gate bias voltage being a voltage potential of the second switch gate over the second switch source, the second switch drain and the second inductor terminal being coupled together, the second switch source being coupled to the common ground reference, the method comprising the acts of:

during a pseudo-boost mode on-cycle, coupling the first switch gate to the greater of Vin and Vout, coupling the second switch gate to Vin, whereby the inductor current increases at a rate of about Vin/L; and during a pseudo-boost mode off-cycle, coupling the second switch gate to a ground reference, coupling the first switch gate to Vin, coupling the body of the first switch to the second inductor terminal, whereby the first switch acts as a diode biased in the direction from Vout to the second inductor terminal and having a breakdown voltage equal to the first gate bias voltage and whereby the inductor current decreases at a rate of about (the first gate bias voltage)/L.

23. A method as recited in claim 22 wherein the first switch is a PMOS transistor.

24. A method as recited in claim 23 wherein the diode is that diode formed in the body of the PMOS transistor.

25. A method as recited in claim 22 wherein the first switch is a pnp bipolar transistor.

26. A method as recited in claim 22 wherein the second switch is an NMOS transistor.

27. A method as recited in claim 22 wherein the second switch is a npn bipolar transistor.

28. A method as recited in claim 22 further comprising the act of sensing Vout, and wherein the power supply is operated in the pseudo-boost mode until Vout reaches a predefined threshold value $V_{t2}$ that is greater than or equal to Vin, at which point the power supply is operated according to a traditional boost duty-cycle algorithm.

29. A method as recited in claim 28 wherein the power supply further includes a third switch having a gate, a source, and a drain, the drain being coupled to the first inductor terminal and the source being coupled to Vout, the method further comprising the act of:

operating in a linear mode until the output voltage Vout reaches a precharge voltage Vpc, wherein during the linear mode the third switch gate is coupled to Vin, and both the first and second switches are disabled, thereby directly coupling the input voltage Vin to the output voltage Vout and charging the capacitor.

30. A method as recited in claim 29 wherein the third switch is an NMOS transistor.

31. A method for controlling a switching power supply to generate an output voltage Vout from an input power supply having first and second terminals and an input voltage Vin, the second input power supply terminal being coupled to a common ground reference, the switching power supply including a) an inductor having first and second terminals, the first inductor terminal and the first input power supply terminal being coupled together, the inductor having an inductance L, b) a capacitor having first and second terminals, the second capacitor terminal being coupled to the common ground reference, c) a first switch having a gate, a drain, and a source, the first switch operable such that a first gate bias voltage controls a flow of current through the first switch between the first switch drain and the first switch source, the first gate bias voltage being a voltage potential of the first switch gate over the first switch source, the second inductor terminal and the first switch source being coupled together, the first switch drain, the output node and the first capacitor terminal being coupled together, d) a second switch having a gate, a drain, and a source, the second switch operable such that a second gate bias voltage controls a flow of current through the second switch between the second switch drain and the second switch source, the second gate bias voltage being a voltage potential of the second switch gate over the second switch source, the second switch drain and the second inductor terminal being coupled together, the second switch source being coupled to the common ground reference, e) a third switch having a gate, a source, and a drain, the drain being coupled to the first inductor terminal and the source being coupled to Vout and f) a diode having an anode and a cathode, the method comprising the acts of:

operating in a linear mode until the output voltage Vout reaches a precharge voltage Vpc, wherein the third switch gate is coupled to Vin, and both the first and second switches are disabled, thereby directly coupling the input voltage Vin to the output voltage Vout and charging the capacitor;

operating in a pseudo-buck mode when the output voltage Vout is between about Vpc and a first threshold voltage $V_{t1}$, the pseudo-buck mode having:

a pseudo-buck mode on-cycle wherein the first and second switch gates are coupled to the common ground reference, and a pseudo-buck mode off-cycle wherein the second switch gate is coupled to the common ground reference, the first switch gate is coupled to the input voltage Vin, the body of the first switch is coupled to the second inductor terminal; and operating in a pseudo-boost mode when the output voltage exceeds the first threshold voltage $V_{t1}$, the pseudo-boost mode having:

a pseudo-boost mode on-cycle wherein the first switch gate is coupled to the greater of Vin and Vout, the second switch gate is coupled to Vin, the and a pseudo-boost mode off-cycle wherein the second switch gate is coupled to the ground reference, the first switch gate is coupled to Vin, and the body of the first switch is coupled to the second inductor terminal.

32. A method as recited in claim 31 further comprising the act of operating according to a traditional boost duty-cycle algorithm once the output voltage Vout has exceeded a second threshold voltage $V_{t2}$ that is greater than or equal to Vin.

33. A method as recited in claim 31 wherein the first switch is a PMOS transistor.

34. A method as recited in claim 31 wherein the first switch is a pnp bipolar transistor.

35. A method as recited in claim 31 wherein the second switch is an NMOS transistor.

36. A method as recited in claim 31 wherein the second switch is a npn bipolar transistor.

37. A method as recited in claim 31 wherein the third switch is an NMOS switch.

38. A method as recited in claim 31 wherein the third switch is a npn bipolar transistor.

39. A switching power supply operable to generate an output voltage Vout from an input power supply having first and second terminals and an input voltage Vin, the second input power supply terminal being coupled to a common ground reference, the switching power supply including:

an inductor having first and second terminals, the first inductor terminal and the first input power supply terminal being coupled together;

an output capacitor having first and second terminals, the second capacitor terminal being coupled to the common ground reference, the output voltage Vout being the voltage difference between the first capacitor terminal and the common ground reference;

a first variable impedance device coupling the second inductor terminal and the first capacitor terminal together;

a second variable impedance device coupling the second inductor terminal and the common ground reference together; and a control circuit capable of controlling the first variable impedance device, and the second variable impedance device, the control circuit operable to implement a pseudo-buck mode suitable for operation when the output voltage Vout is less than the input voltage Vin, wherein:

during a pseudo-buck mode on-cycle, the first variable impedance device and the second variable impedance device are adjusted such that all the inductor current flows through the first variable impedance device and charges the output capacitor, the first variable impedance device adjusted such that the inductor current is increasing; and during a pseudo-buck mode off-cycle, the first variable impedance device and the second variable impedance device are adjusted such that all the inductor current flows through the first variable impedance device and charges the output capacitor, the first variable impedance device adjusted such that the inductor current is decreasing.

40. A switching power supply as recited in claim 39, wherein the rate of increase of the inductor current during the pseudo-buck mode on-cycle is proportional to a difference between the input voltage Vin and the output voltage Vout.

41. A switching power supply as recited in claim 40 wherein the rate of increase of the inductor current during the pseudo-buck mode on-cycle is about (Vin−Vout)/L, where L is the inductance of the inductor.

42. A switching power supply as recited in claim 39 wherein the rate of decrease of the inductor current during the pseudo-buck mode off-cycle is proportional to a voltage differential between the input voltage Vin and a voltage present at the second inductor terminal.

43. A switching power supply as recited in claim 39 wherein the control circuit is further operable to implement a pseudo-boost mode suitable for providing a smooth transition of the output voltage Vout from a voltage less than the input voltage Vin to a voltage greater than or equal to the input voltage Vin, wherein:

during a pseudo-boost mode on-cycle, the first variable impedance device and the second variable impedance device are adjusted such that the inductor current is increasing and all the inductor current flows through the second variable impedance device to ground; and during a pseudo-boost mode off-cycle, the first variable impedance device and the second variable impedance device are adjusted such that all the inductor current flows through the first variable impedance device and charges the output capacitor, the first variable impedance device adjusted such that the inductor current is decreasing.

44. A switching power supply as recited in claim 43 wherein a rate of increase of the inductor current during the pseudo-boost mode on-cycle is proportional to the input voltage Vin.

45. A switching power supply as recited in claim 44 wherein the rate of increase of the inductor current is equal to Vin/L, where L is the inductance of the inductor.

46. A switching power supply as recited in claim 43 wherein the rate of decrease of the inductor current during the pseudo-boost mode off-cycle is proportional to a voltage differential between the input voltage Vin and a voltage present at the second inductor terminal.

47. A switching power supply as recited in claim 39 further including a third variable impedance device coupling the first inductor terminal to the first capacitor terminal.

48. A switching power supply as recited in claim 47 wherein the third variable impedance device is an NMOS transistor.

49. A switching power supply as recited in claim 47 wherein the third variable impedance device is a bipolar npn transistor.

50. A switching power supply as recited in claim 48 wherein the control circuit is further capable of controlling the third variable impedance device, the control circuit operable to implement a linear mode suitable for charging the output capacitor to a precharge voltage, the linear mode adjusting the first and second variable impedance devices to their highest impedance level, and adjusting the third variable impedance device to its lowest impedance level, thereby coupling the input voltage Vin to the output voltage Vout and charging the output capacitor.

51. A switching power supply as recited in claim 39 wherein the first variable impedance device is a PMOS transistor.

52. A switching power supply as recited in claim 39 wherein the first variable impedance device is a bipolar pnp transistor.

53. A switching power supply as recited in claim 39 wherein the second variable impedance device is an NMOS transistor.

54. A switching power supply as recited in claim 39 wherein the second variable impedance device is a bipolar npn transistor.

55. A switching power supply as recited in claim 39 wherein the control circuit includes a microprocessor.

56. A switching power supply as recited in claim 39 wherein the control circuit includes programmable logic.

57. A switching power supply as recited in claim 39 wherein the control circuit includes an application specific integrated circuit (ASIC).

58. A switching power supply as recited in claim 39 wherein each element is formed within a single integrated circuit package.

* * * * *